(12) United States Patent
Kuroi et al.

(10) Patent No.: US 8,169,702 B2
(45) Date of Patent: May 1, 2012

(54) SCREEN UNIT

(75) Inventors: Kiyoshi Kuroi, Matsumoto (JP);
Hiroyuki Shindo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/030,677

(22) Filed: Feb. 18, 2011

(65) Prior Publication Data

US 2011/0199678 A1 Aug. 18, 2011

(30) Foreign Application Priority Data

Feb. 18, 2010 (JP) ................................. 2010-033251
May 13, 2010 (JP) ................................. 2010-110885

(51) Int. Cl.
*G03B 21/56* (2006.01)
(52) U.S. Cl. ....................................................... 359/461
(58) Field of Classification Search .................. 359/461, 359/449, 443; 160/120, 315
See application file for complete search history.

(56) References Cited

U.S. PATENT DOCUMENTS

| 6,297,905 | B1 | 10/2001 | Takamoto et al. |
| 6,873,460 | B1 * | 3/2005 | Burstyn et al. ................. 359/461 |
| 7,042,640 | B2 * | 5/2006 | Devos et al. ................... 359/443 |
| 7,203,000 | B2 | 4/2007 | Kotera |
| 7,602,549 | B2 * | 10/2009 | Yamauchi ..................... 359/449 |
| 7,623,290 | B2 * | 11/2009 | Liang et al. ................... 359/443 |
| 2005/0174638 | A1 | 8/2005 | Kotera |

FOREIGN PATENT DOCUMENTS

| JP | 2000-131766 | 5/2000 |
| JP | 2004-046078 | 2/2004 |

* cited by examiner

*Primary Examiner* — Christopher Mahoney
(74) *Attorney, Agent, or Firm* — Workman Nydegger

(57) ABSTRACT

A screen unit includes: a screen member; a first support member which supports one end of the screen member; a second support member which supports the other end of the screen member; a stretching and contracting device which expands the screen member; and a tensioning member disposed on the side opposite to the side where the screen member is provided with respect to the stretching and contracting device to apply tension in a direction substantially parallel with the direction from the first support member to the second support member.

18 Claims, 9 Drawing Sheets

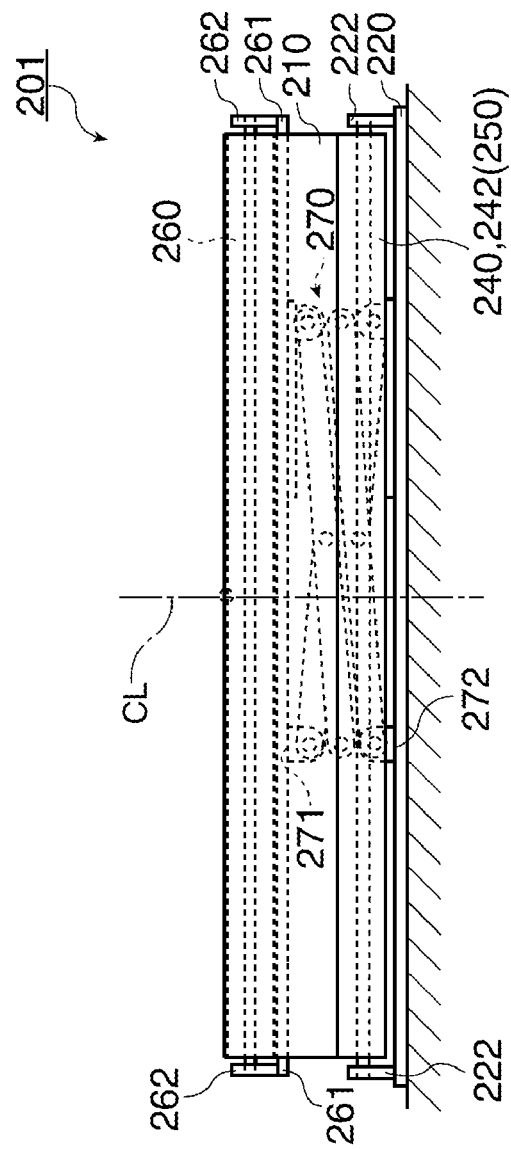
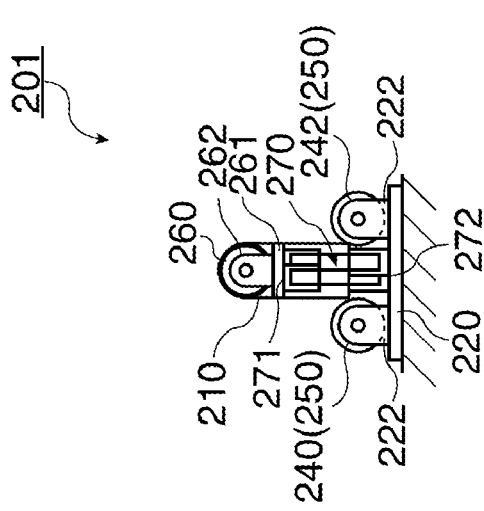
FIG. 9B
FIG. 9A

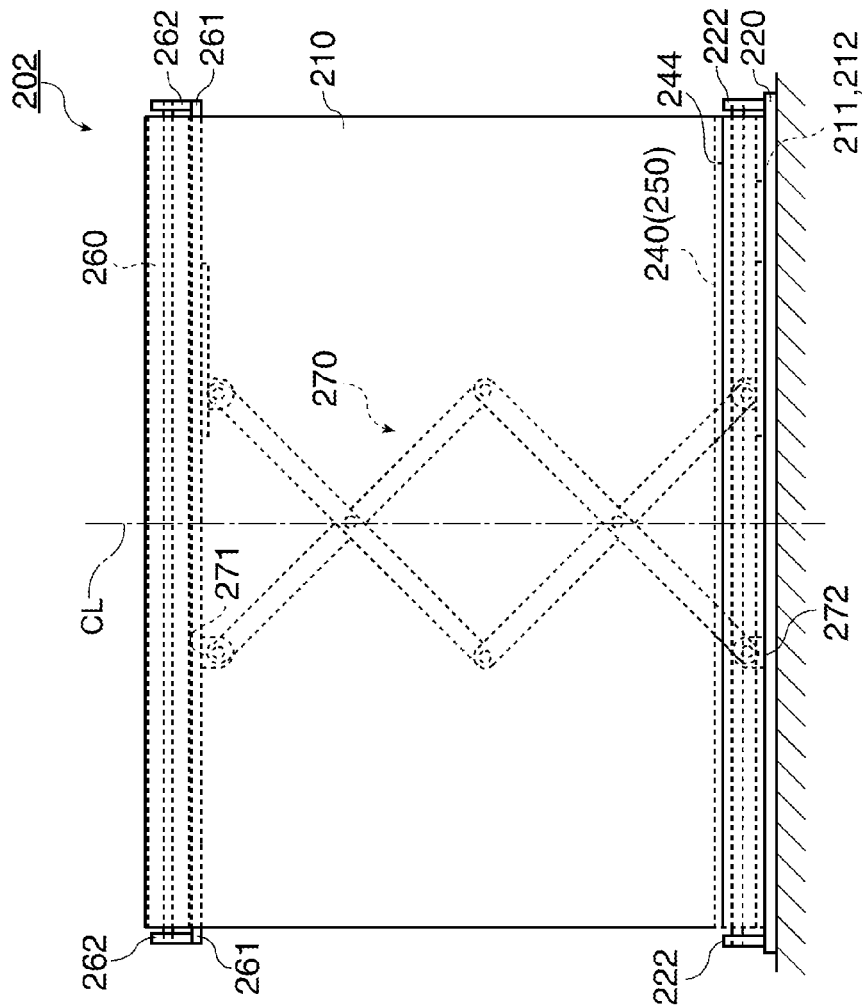
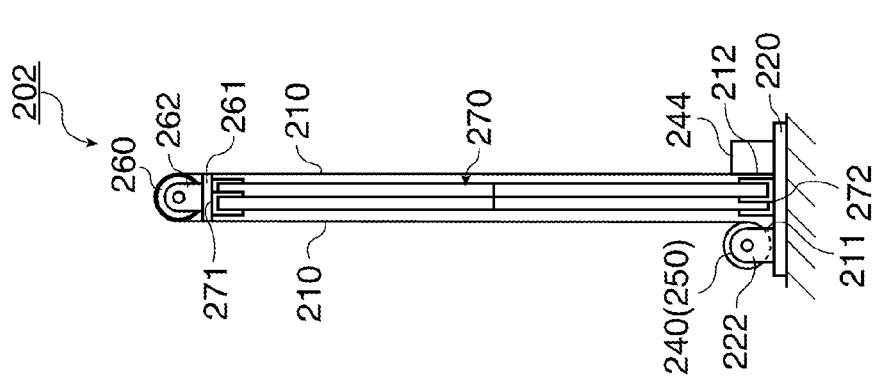
FIG. 10B
FIG. 10A

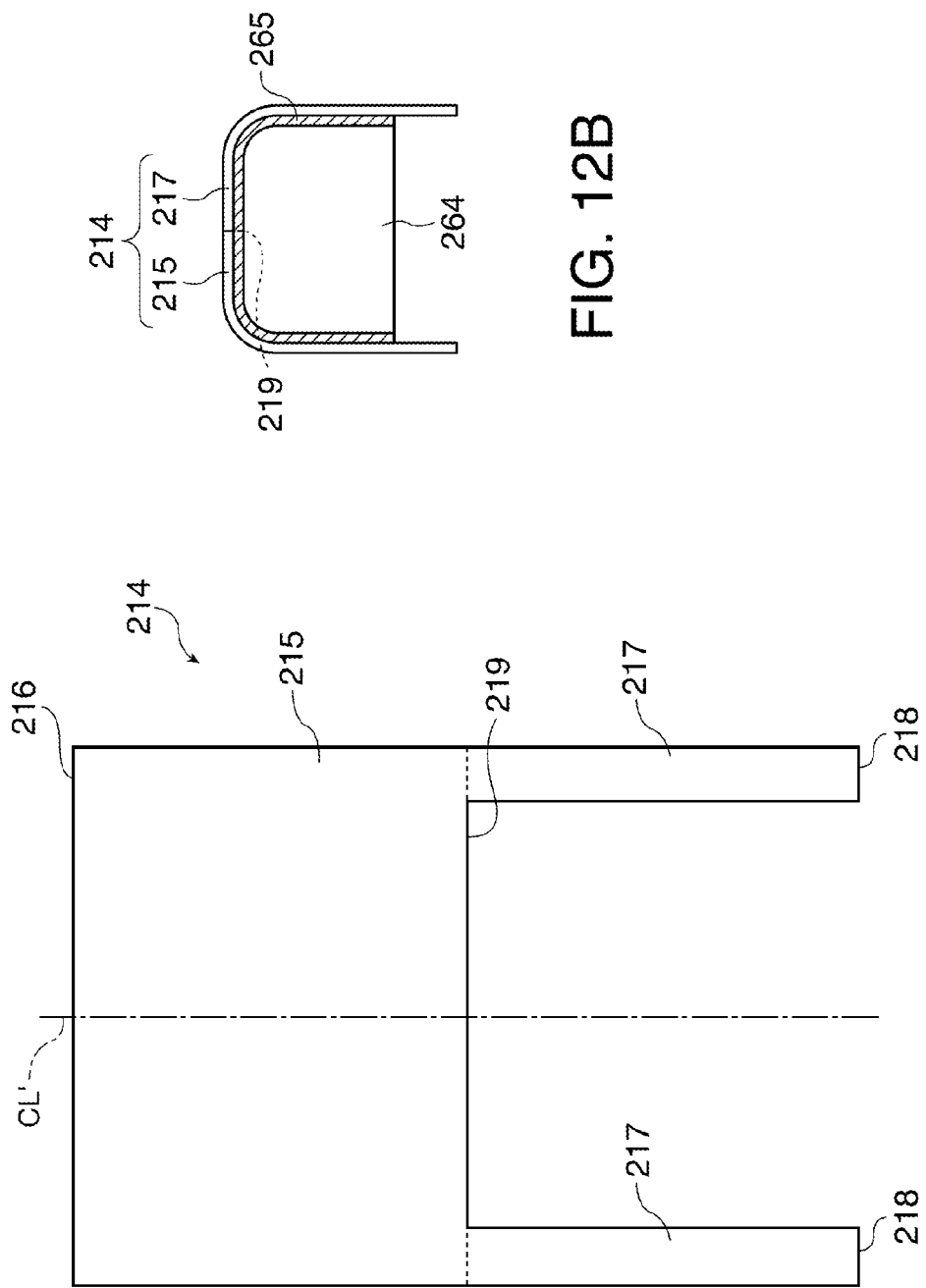

SCREEN UNIT

The entire disclosure of Japanese Patent Application Nos. 2010-33251, filed Feb. 18, 2010 and 2010-110885, filed May 13, 2010 are expressly incorporated by reference herein.

BACKGROUND

1. Technical Field

The present invention relates to a screen unit.

2. Related Art

A screen unit which includes a substantially rectangular screen member having flexibility, a winding shaft for supporting one end of the screen member and functioning as a shaft around which the screen member is wound, a support body for supporting the side of the screen member opposed to the side supported by the winding shaft, and an elevating mechanism attached to the support body to control the height of the screen member is known (for example, see JP-A-2000-131766).

In addition, a screen unit which includes a screen, an upper end support member for supporting one end of the screen, a base member to which a winding member is attached, the winding member for supporting the other end of the screen with a winding force applied thereto, and a connecting mechanism (link mechanism) extended between the upper end support member and the base member and having an upper arm and a lower arm pivotally connected to each other is known (for example, see JP-A-2004-46078).

According to the screen unit disclosed in JP-A-2000-131766, the elevating mechanism which has three pairs of arms connected with one another is extended between the support member for supporting one end of the screen member and the winding shaft for supporting the side of the screen member opposed to the side supported by the support body. A pair of springs (gas springs or coil springs) are disposed between the one pair of the arms positioned at the center of the elevating mechanism in the up-down direction and the one pair of the arms positioned on the winding shaft side. According to this structure, the elevating mechanism is stretched and contracted by using the pressure or the elastic force of the springs to achieve expansion and storage of the screen member.

In addition, in case of the screen unit shown in JP-A-2000-131766, expansion of the screen member is also achieved by using tension applied to the screen member as well as stretch and contract of the elevating mechanism by using a pair of the spring coils.

According to the screen unit disclosed in JP-A-2004-46078, an urging unit (gas spring) for urging the lower arm of the connecting mechanism to shift upward is equipped. In this structure, the expanded condition of the screen can be maintained by producing a balanced condition between the downward winding force applied to the screen by the winding member, the upward shifting force applied to the arm of the connecting mechanism by using the gas spring, and others.

According to the screen unit disclosed in JP-A-2000-131766, the surface (rear surface) opposite to the surface (front surface) to which the screen member is attached with respect to the elevating mechanism is not tensioned. Thus, the force on the front surface side of the elevating mechanism is not balanced against the force on the rear surface side. In this case, the elevating mechanism is difficult to be maintained in a vertical posture, and inclined toward the side to which the screen member is attached. As a result, the screen member itself is inclined, causing deformation of images projected thereon from a projector.

According to the screen unit disclosed in JP-A-2004-46078, the front surface side to which the screen is attached with respect to the connecting mechanism is tensioned by the winding force applied to the screen under the expanded condition of the screen, but the rear surface side is not tensioned. In this condition, the force on the front surface side of the connecting mechanism is not balanced against the force on the rear surface side, which produces the possibility that the connecting mechanism is inclined toward the front surface side. In this case, the screen itself attached to the front surface side of the connecting mechanism is inclined, causing deformation of images projected on the projection surface of the screen from a projector or the like.

SUMMARY

An advantage of some aspects of the invention is to provide a technology capable of solving at least a part of the problems described above and the invention can be implemented as the following forms.

A screen unit according to a first aspect of the invention includes: a screen member on which an image is projected; a first support member which supports one end of the screen member; a second support member which supports the other end of the screen member; a stretching and contracting device which stretches in a predetermined direction to expand the screen member and supports the first support member; and a tensioning member disposed on the side opposite to the side where the screen member is provided with respect to the stretching and contracting device to apply tension in a direction substantially parallel with the direction from the first support member to the second support member.

According to this structure, tension can be produced to the surface disposed opposite to the surface to which the screen member is attached with respect to the stretching and contracting device by using the tensioning member disposed on the side opposite to the screen member for tensioning. By this method, the tension generated between the first support member attached to the one end of the screen member and the second support member attached to the other end of the screen member opposed to the one end can be cancelled by the tension produced by the tensioning member. Accordingly, the force on the front surface of the stretching and contracting device can be balanced against the force on the rear surface of the stretching and contracting device, allowing the stretching and contracting device to be maintained in a vertical posture.

In a specific example of the invention, a screen unit includes a substantially rectangular screen member having flexibility; a first support member attached to one end of the screen member; a second support member attached to the other end of the screen member and disposed so as to be opposed to the first support member; an elevating mechanism one end of which is attached to the first support member; and a tensioning member disposed on the side opposite to the side where the screen member is disposed with respect to the elevating mechanism, one end of the tensioning member attached to the first support member, and the tensioning member applying tension in a direction substantially parallel with the direction from the first support member to the second support member.

According to this structure, tension can be produced to the surface disposed opposite to the surface to which the screen member is attached with respect to the elevating mechanism by using the tensioning member one end of which is attached to the first support member to apply tension. By this method, the tension generated between the first support member attached to the one end of the screen member and the second support member attached to the other end of the screen member opposed to the one end can be cancelled by the tension produced by the tensioning member. Accordingly, the force on the front surface of the elevating mechanism can be balanced against the force on the rear surface of the elevating mechanism, allowing the elevating mechanism to be maintained in a vertical posture.

It is preferable that the screen unit further includes: a base member attached to the other end of the elevating mechanism; and a third support member attached to the other end of the tensioning member. The second support member or the third support member is attached to the base member.

According to this structure, one end of the tensioning member is supported by the third support member, and the third support member is attached to the base member. Thus, the tensioning member attached between the first support member and the third support member can be securely tensioned, allowing the elevating mechanism to be more securely maintained in a vertical posture.

It is preferable that the tensioning member is made of flexible material in the screen unit.

According to this structure, the screen member attached to the front surface of the elevating mechanism and the material attached to the rear surface of the elevating mechanism have substantially symmetric structures with respect to the elevating mechanism. In this case, the tension on the front surface of the elevating mechanism is equalized with the tension on the rear surface of the elevating mechanism, allowing the posture of the elevating mechanism to be further easily maintained.

Moreover, when the tensioning member is made of flexible material, the elevating mechanism can be sandwiched between the screen member and the tensioning member. In this case, the elevating mechanism exposed in an ordinary structure can be covered without exposure. Thus, a hand or the like cannot be easily inserted into the joint of the elevating mechanism, which reduces the possibility of unexpected danger to a finger, a nail or the like.

Furthermore, when the material is attached to the rear surface of the elevating mechanism, images can be projected on the rear surface of the screen unit as well. Thus, images can be simultaneously projected both on the front surface and the rear surface. When material having characteristics different from those of the screen material is adopted as the material of the tensioning member, the front surface and the rear surface of the screen unit can be separately used for different purposes in accordance with the use environment.

It is preferable that the second support member or the third support member has a winding structure in the screen unit.

According to this structure, the tensioning member or the screen member can be wound after the expansion and storage of the screen member by using the elevating mechanism. Thus, the compactness and the portability of the screen unit when the screen unit is not used can increase.

It is preferable that the tensioning member is a string-shaped member in the screen unit. The second support member or the third support member has a winding structure.

When the tensioning member is constituted by a string-shaped member, the winding structure of the tensioning member can be easily mounted in a space-saving condition and at low cost. Thus, the structure capable of maintaining the posture of the elevating mechanism can be mounted without considerably changing the structure of a related-art screen unit.

Moreover, when the plural tensioning structures thus constructed are attached, maintenance of the horizontality of the first support member and reduction of warp on the first support member can be achieved.

A screen unit according to another aspect of the invention includes: a screen section including a screen member on which image light is projected, and a sheet-shaped member disposed at one end of the screen member and combined with the screen member into one body; a second support member extending along the other end of the screen member of the screen section to support the other end of the screen member; a third support member which supports the end of the sheet-shaped member of the screen section opposite to the side where the screen member is disposed, and extends substantially in parallel with the second support member; a winding mechanism provided on at least either the second support member or the third support member; a connecting mechanism which stretches and contracts in a direction substantially perpendicular to the extension directions of the second support member and the third support member to shift one end and the other end of the connecting mechanism close to and away from each other; and a first support member supported by the one end of the connecting mechanism and extending substantially in parallel with the second support member and the third support member. The second support member and the third support member are disposed on the side where the other end of the connecting mechanism is disposed with the connecting mechanism interposed between the second support member and the third support member. The screen section is folded on the side where the one end of the connecting mechanism is disposed in such a condition that the screen section rides on the first support member.

According to this structure, the screen section including the screen member and the sheet-shaped member combined into one body is folded on the side where the one end of the connecting mechanism is disposed in such a condition that the screen section rides on the first support member. Thus, when the one end and the other end of the connecting mechanism are separated away from each other by expansion of the connecting mechanism, the area of the screen section between both ends of the screen section supported by the second support member and the third support member is supported by the first support member and pulled upward from the second support member and the third support member to be expanded. Under the expanded condition of the screen section, therefore, tension is applied to both the second support member side and the third support member side of the screen section with respect to the connecting mechanism. In this case, the tension applied to the second support member side is cancelled by the tension applied to the third support member side with respect to the connecting mechanism, allowing the posture of the connecting mechanism to be stabilized without inclination. As a result, deformation of images displayed on the projection surface of the screen section can be prevented.

The screen member and the sheet-shaped member are combined into one body by joining methods such as sewing, bonding, and depositing, or by forming the screen member and the sheet-shaped member integrally with each other from one sheet-shaped material of the screen member and the sheet-shaped member without joint such as sewing, bonding and depositing.

It is preferable that the winding mechanism is provided on each of the second support member and the third support member in the screen unit.

According to this structure, the winding mechanism is provided on each of the second support member and the third support member. Thus, tension can be applied to both the front surface side and the rear surface side of the screen section.

It is preferable that the winding mechanism is provided on either the second support member or the third support member in the screen unit. The other of the second support member and the third support member is a fixed support member.

According to this structure, either the second support member or the third support member is the fixed support member. Thus, the structure of the screen unit can be further simplified.

It is preferable that the first support member is rotatable around a rotation axis extending along the extension direction of the first support member in the screen unit.

According to this structure, the first support member on which the screen section rides is rotatable. In this case, the screen section can easily shift between the front surface side and the rear surface side. Thus, when the tension on the front surface side is different from the tension on the rear surface side, the tension applied to the front surface side of the connecting mechanism can be almost balanced against the tension applied to the rear surface side of the connecting mechanism. When either the second support member or the third support member is the fixed support member, the screen section can be easily wound around the other of the second and third support members provided with the winding mechanism.

It is preferable that an area of the first support member contacting the screen section has a surface having a small friction coefficient in the screen unit.

According to this structure, the screen section can easily shift between the front surface side and the rear surface side by sliding on the surface of the first support member having the small friction coefficient.

It is preferable that a boundary area of the screen section between the screen member and the sheet-shaped member is fixed to the first support member in the screen unit.

According to this structure, the screen member and the sheet-shaped member do not shift between the front surface side and the rear surface side. Thus, the screen member and the sheet-shaped member can be disposed on one of the front and rear surface sides and the other surface, respectively, regardless of whether the connecting mechanism is stretched or contracted.

It is preferable that the sheet-shaped member includes a band-shaped portion having a width smaller than that of the screen member in the screen unit.

According to this structure, the quantity of the material required for producing the screen section can be reduced. Thus, the screen unit can be made lightweight, and the material cost can be lowered.

It is preferable that the screen section is one component formed by single material in the screen unit.

According to this structure, the screen section is disposed on both the front surface side and the rear surface side of the screen unit. Thus, the rear surface side can be used as the projection surface as well.

BRIEF DESCRIPTION OF THE DRAWINGS

The invention will be described with reference to the accompanying drawings, wherein like numbers reference like elements.

FIGS. 9A and 9B illustrate the general structure of the screen unit according to the third embodiment.

FIGS. 10A and 10B illustrate the general structure of a screen unit according to a fourth embodiment.

FIGS. 12A and 12B illustrate the general structure of the screen unit according to the fifth embodiment.

DESCRIPTION OF EXEMPLARY EMBODIMENTS

Exemplary embodiments according to the invention are hereinafter described with reference to the drawings. In the respective figures referred to herein, dimensional proportions, angles and the like of respective elements and parts are varied as necessary for easy understanding of structures.

First Embodiment

Figures 1A, 1B:
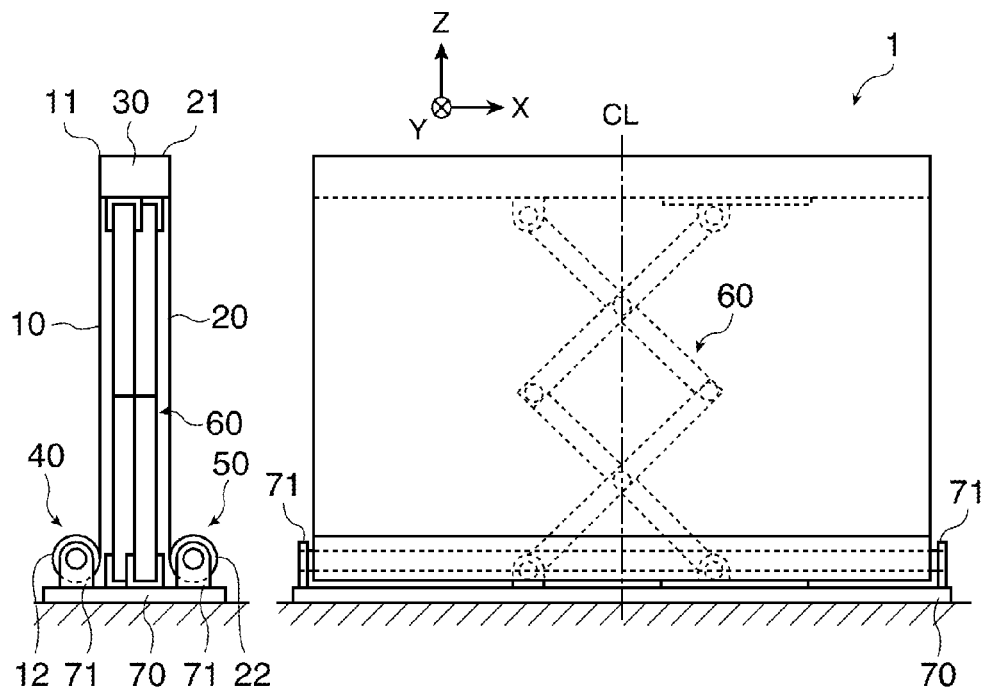
FIGS. 1A and 1B illustrate the general structure of a screen unit according to a first embodiment.
Figures 2A, 2B:
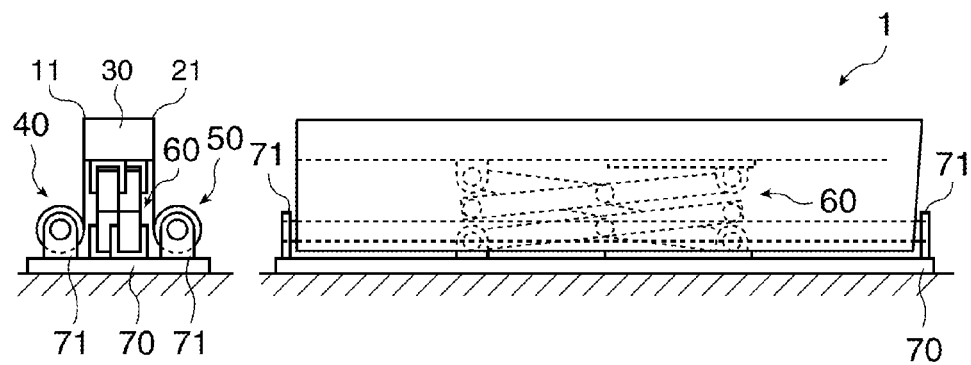
FIGS. 2A and 2B illustrate the general structure of the screen unit according to the first embodiment.
Figure 3:
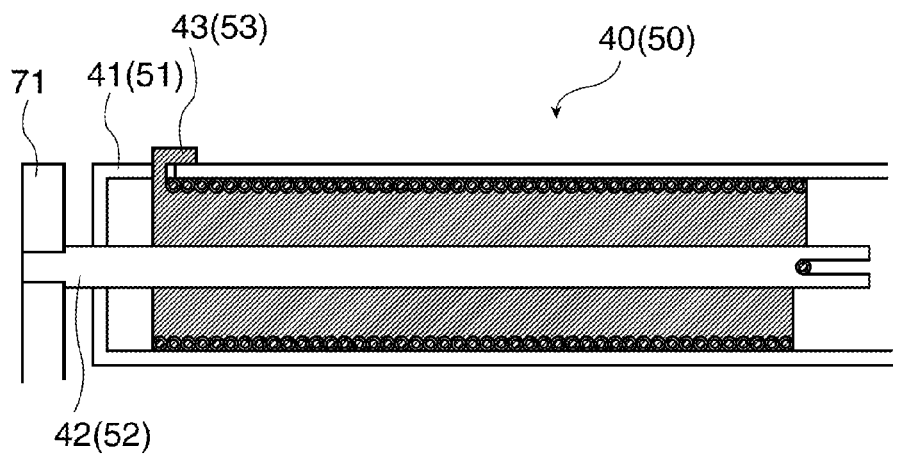
FIG. 3 illustrates a winding structure of the screen unit according to the first embodiment.

A screen unit according to a first embodiment is now described with reference to FIGS. 1A and 1B, 2A and 2B, and 3. FIGS. 1A and 1B, 2A and 2B, and 3 illustrate the general structure of the screen unit according to the first embodiment. FIGS. 1A and 1B show the screen unit in an expanded condition. FIG. 1A is a side view of the screen unit, while FIG. 1B is a rearview of the screen unit. FIGS. 2A and 2B show the screen unit in a stored condition. FIG. 2A is a side view of the screen unit, while FIG. 2B is a rear view of the screen unit. FIG. 3 illustrates the details of a winding structure in this embodiment.

As illustrated in FIGS. 1A and 1B, a screen unit 1 in the first embodiment includes a screen 10 as a substantially rectangular screen member having flexibility, a supplementary curtain 20 formed by flexible material as a tensioning member, a support member 30 as a first support member (support body), a winding mechanism 40 as a second support member (support body), a winding mechanism 50 as a third support member (support body), a pantograph mechanism 60 as a stretching and contracting device (elevating mechanism), and a base member 70 to which the winding mechanism 40, the winding mechanism 50, and the pantograph mechanism 60 are attached. The screen unit 1 is constructed such that the screen 10 and the supplementary curtain 20 can be simultaneously drawn out and expanded at the time of use, and can be wound around the winding mechanism 40 and the winding mechanism 50, respectively, when the screen unit 1 is not used. In this embodiment, a case in which the screen unit 1 is placed on a floor surface indicated by a crosshatched area in the figures will be discussed as an application example. FIG. 1B shows the supplementary curtain 20 and the winding mechanism 50 in perspective.

In the following explanation, the direction toward the floor surface on which the screen unit 1 is placed is referred to as the downward direction in some cases, and the direction toward the ceiling surface is referred to as the upward direction in some cases. The use condition in which the screen 10 becomes substantially flat and forms a projection surface at the time of use of the screen unit 1 is referred to as the expanded condition in some cases. Under the expanded condition of the screen 10, the projection surface and the side opposite to the projection surface are referred to as the front surface and the rear surface, respectively, in some cases. In this condition, the right side as viewed from the rear surface and the left side as viewed from the rear surface are referred to as the right and the left, respectively, in some cases. These definitions are applicable to the other embodiments as well.

The screen 10 is a reflection type screen having flexibility, and displays an image by reflecting image light projected from a projector or the like on the projection surface of the screen 10 on the front surface side, for example. The screen 10 has a side 11 as one end and a side 12 as the other end opposed to each other. The side 11 and the side 12 are disposed substantially parallel with each other. In the following explanation, the direction extending along the side 11 and the side 12 is referred to as an X direction in some cases. The side 11 is supported by the support member 30, while the side 12 is supported by a winding shaft 41 provided on the winding mechanism 40. The supplementary curtain 20 has a side 21 as one end and a side 22 as the other end opposed to each other similarly to the screen 10. The side 21 and the side 22 are disposed substantially parallel with each other. The side 21 is supported by the support member 30, while the side 22 is supported by a winding shaft 51 provided on the winding mechanism 50.

A center line CL indicated by an alternate long and short dash line is a line connecting the center of the side 11 in the X direction and the center of the side 12 in the X direction, and crosses the X direction substantially at right angles. In the following explanation, the direction extending along the center line CL is referred to as a Z direction in some cases, and the direction crossing the X direction and the Z direction substantially at right angles is referred to as a Y direction in some cases. The plane defined by the X direction and the Y direction is a plane disposed substantially in parallel with the floor surface as the installation surface on which the screen unit 1 or the base member 70 is placed. The plane defined by the X direction and the Z direction is a plane disposed substantially in parallel with the projection surface of the screen 10 in the expanded condition.

The base member 70 is positioned on the floor surface side on which the screen unit 1 is installed, and extends in the X direction. The base member 70 is a part to which the winding mechanism 40, the winding mechanism 50, bearings 71, and the pantograph mechanism 60 are attached. The pantograph mechanism 60 is constituted by a known device used for a screen such as a pantograph disclosed in JP-A-2000-131766.

The winding mechanism 40 (50) is disposed in such a position that the winding shaft 41 (51) of the winding mechanism 40 (50) extends in the X direction. The pantograph mechanism 60 is disposed in parallel with the plane defined by the X direction and the Z direction. In this case, approximately the center of the pantograph mechanism 60 in the X direction under the expanded position, approximately the center of the winding mechanism 40 in the X direction, and approximately the center of the winding mechanism 50 in the X direction are positioned substantially on the same plane. A pair of the bearings 71 for supporting the winding mechanism 40 (50) are provided at both ends of the winding mechanism 40 (50) in the X direction.

The winding mechanism 40 and the winding mechanism 50 extend in the X direction substantially in parallel with the base member 70. The winding mechanism 40 (50) has the winding shaft 41 (51), a torsion spring 42 (52), and a shaft (53). The winding shaft 41 is a cylindrical component extending in the X direction and supporting the side 12 of the screen 10. The winding shaft 41 is a shaft around which the screen 10 is wound. The winding shaft 51 is a cylindrical component extending in the X direction and supporting the side 22 of the supplementary curtain 20 similarly to the winding shaft 41. The winding shaft 51 is a shaft around which the supplementary curtain 20 is wound.

The torsion spring 43 (53) and the shaft 42 (52) are inserted into the vicinity of the end of the winding shaft 41 (51), and extend in the X direction similarly to the winding shaft 41 (51). The torsion spring 43 (53) is provided in such a condition as to store a force in accordance with the rotation in the direction for drawing the screen 10 and the supplementary curtain 20 at the time of expansion. One end of the torsion spring 43 (53) is fixed to the winding shaft 41 (51), and the other end of the torsion spring 43 (53) is fixed to the shaft (52). The shaft 42 (52) is supported by the bearing 71 provided on the base member 70 in such a condition that the rotation of the shaft 42 (52) is regulated by the bearing 71. According to this structure, when the winding shafts 41 and 51 are rotated in the direction for drawing the screen 10 and the supplementary curtain 20, urging forces for rotating the winding shafts 41 and 51 in the winding direction are produced.

When the pantograph mechanism 60 stretches, the screen 10 and the supplementary curtain 20 rotate in the drawing direction and produce the urging forces for rotating in the winding direction. In this case, the winding mechanisms 40 and 50 apply approximately the same tension to the screen 10 and the supplementary curtain 20 in the up-down direction (Z direction) at the time of expansion. Thus, the force on the front side of the pantograph mechanism 60 is balanced against the force on the rear side of the pantograph mechanism 60, allowing the pantograph mechanism 60 to be maintained in a vertical posture. Accordingly, images projected from the projector can be maintained in a preferable condition without inclination of the screen members.

At the time of storage of the screen 10, the screen 10 and the supplementary curtain 20 are wound around the winding shaft 41 and the winding shaft 51, respectively, and stored by the urging forces of the winding mechanisms 40 and 50 (see FIGS. 2A and 2B).

According to the structure of the screen unit 1 in the first embodiment, the following advantages can be offered.

(1) The winding mechanism 40 and the winding mechanism 50 apply substantially the same tension to the screen 10 and the supplementary curtain 20, respectively, in the up-down direction (Z direction). As a result, the force on the front side of the pantograph mechanism 60 is balanced against the force on the rear side of the pantograph mechanism 60, allowing the pantograph mechanism 60 to be maintained in a vertical posture. Accordingly, images projected from the projector can be maintained in a preferable condition without inclination of the screen members.

(2) At the time of storage of the screen unit 1, the screen 10 and the supplementary curtain 20 are wound around the winding shaft 41 and the winding shaft 51 by the urging forces of the winding mechanism 40 and the winding mechanism 50, respectively. Thus, the compactness and portability of the screen unit 1 increase.

(3) Since the front and rear sides of the pantograph mechanism 60 are covered by the screen 10 and the supplementary curtain 20, a hand or the like cannot be easily inserted into the joint of the elevating mechanism. Thus, the possibility of unexpected damage to a finger, a nail or the like can be reduced.

(4) Since the screen 10 and the supplementary curtain 20 are attached to the front surface and the rear surface of the pantograph mechanism 60, respectively, an image can be projected on the rear surface of the screen unit 1 as well.

Accordingly, images can be simultaneously projected both on the front surface and the rear surface.

Second Embodiment

Figures 4A, 4B:
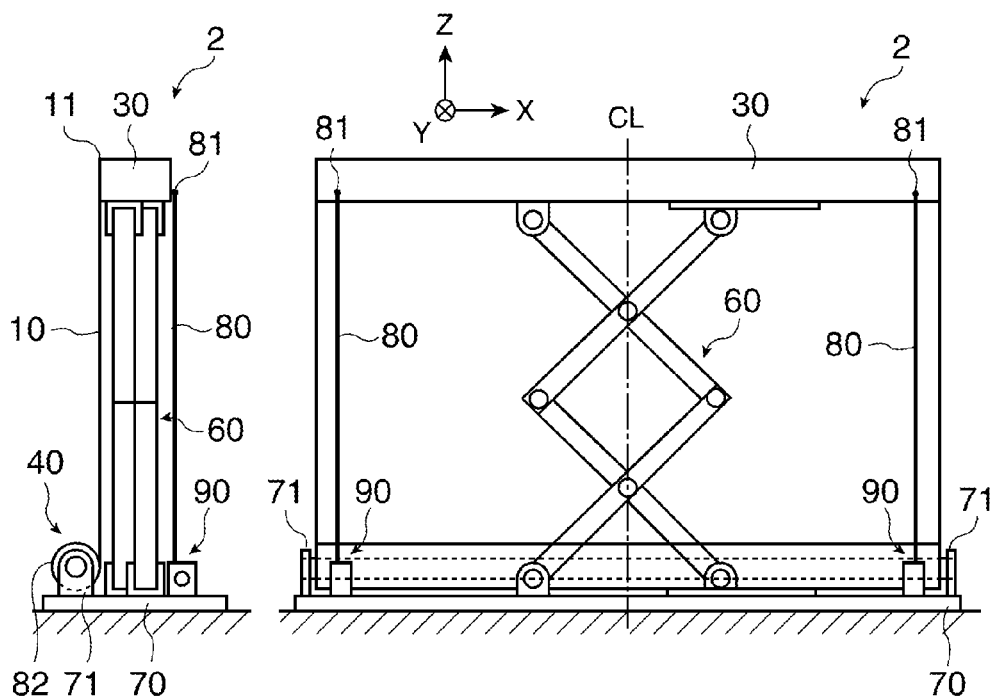
FIGS. 4A and 4B illustrate the general structure of a screen unit according to a second embodiment.
Figures 5A, 5B:
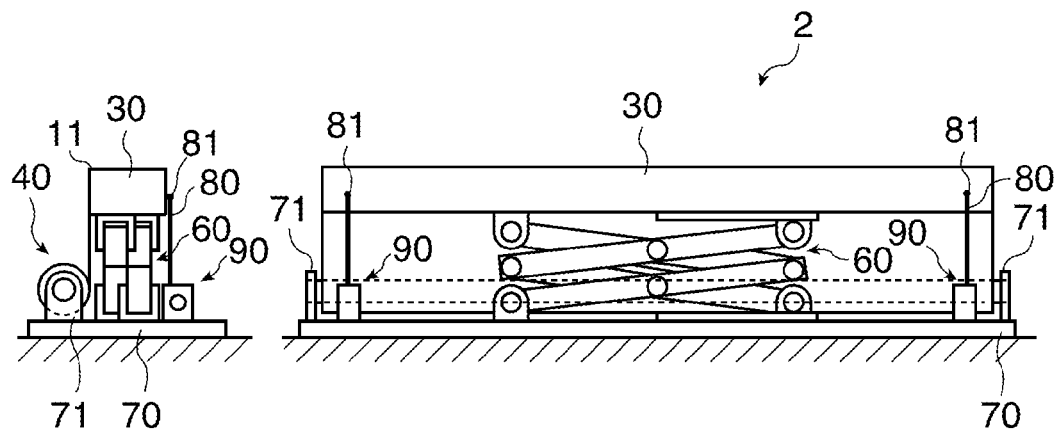
FIGS. 5A and 5B illustrate the general structure of the screen unit according to the second embodiment.
Figure 6:
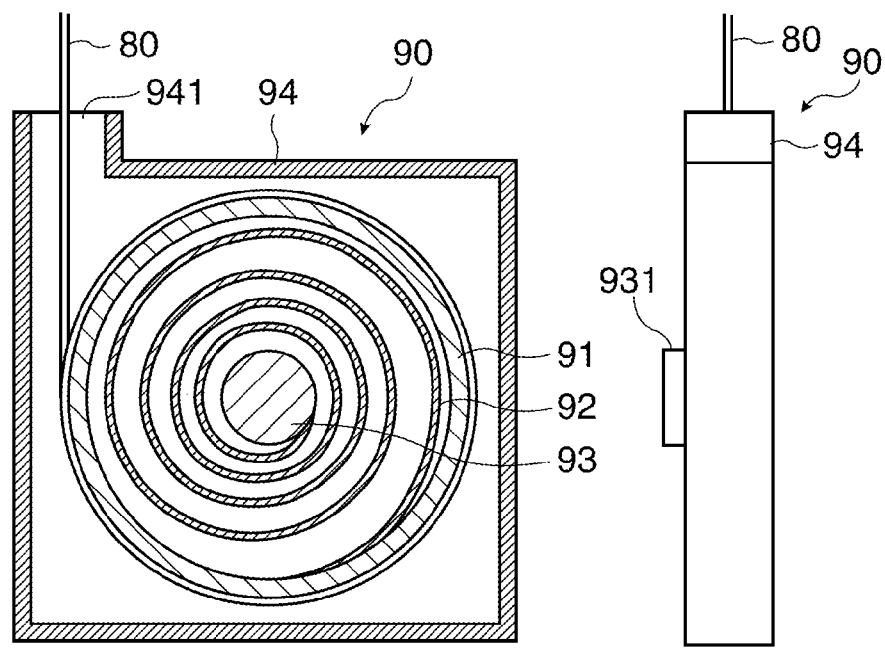
FIG. 6 illustrates a winding structure of the screen unit according to the second embodiment.

A screen unit according to a second embodiment is now described with reference to the drawings. FIGS. 4A and 4B, 5A and 5B, and 6 illustrate the general structure of the screen unit in the second embodiment. More specifically, FIGS. 4A and 4B show the screen unit in the expanded condition. FIG. 4A is a side view of the screen unit, and FIG. 4B is a rear view of the screen unit. FIGS. 5A and 5B show the screen unit in the stored condition. FIG. 5A is a side view, and FIG. 5B is a rear view. FIG. 6 illustrates the detailed structure of a winding mechanism according to this embodiment.

A screen unit 2 in the second embodiment has a structure same as that of the screen unit 1 in the first embodiment except that wires 80 as flexible string-shaped members corresponding to tensioning members and winding structures 90 as third support members are provided. The same reference numbers are given to parts and elements same as the corresponding parts and elements in the first embodiment, and the same explanation is not repeated.

Each of the wires 80 has an end 81 as one end and an end 82 as the other end. The end 81 is supported by the support member 30, while the end 82 is supported by a drum 91 provided on the winding mechanism 90.

As illustrated in FIG. 6, the winding mechanism 90 disposed on the rear surface of the pantograph mechanism 60 has the drum 91, a flat spiral spring 92, a control shaft 93, and a housing 94 having an opening 941 for connecting the inside and the outside of the housing 94.

The drum 91 is accommodated in the housing 94 in such a condition as to be freely rotatable, and supports the end 82 of the wire 80 inserted through the opening 941 into the housing 94 such that the wire 80 can be wound in accordance with the rotation of the drum 91. The flat spiral spring 92 is disposed within the drum 91 with one end of the flat spiral spring 92 fixed to the drum 91 and the other end of the flat spiral spring 92 fixed to the control shaft 93. The flat spiral spring 92 is provided in such a condition as to store a force in the rotation direction for winding the wire 80 when the wire 80 is drawn. The control shaft 93 is attached to the housing 94 in such a position as to locate approximately at the center of the drum 91. A part of the control shaft 93 projects from the housing 94 to the outside to form a projection 931. The projection 931 of the control shaft 93 is rotated to control the urging condition of the flat spiral spring 92.

When the screen 10 is drawn from the winding mechanism 40 in this arrangement, the wires 80 are drawn from the winding mechanisms 90 accordingly. In this case, the flat spiral springs 92 obtain the urging forces in the direction for winding the wires 80 via the drums 91 to which the wires 80 are fixed. Thus, the screen 10 and the wires 80 are tensioned by the winding mechanism 40 and the winding mechanisms 90 in the up-down direction (Z direction) at the time of expansion. However, since the structure of the winding mechanism 40 is different from structures of the winding mechanisms 90, the tension applied to the screen 10 and the tension applied to the wires 80 do not necessarily become approximately the same in the up-down direction (Z direction). According to this embodiment, therefore, the projections 931 of the control shafts 93 provided on the winding mechanisms 90 are rotated to control the urging forces of the flat spiral springs 92 such that the tension applied to the wires 80 becomes substantially the same as the tension applied to the screen 10.

By this method, the force on the front side of the pantograph mechanism 60 is balanced against the force on the rear side of the pantograph mechanism 60, allowing the pantograph mechanism 60 to be maintained in a vertical posture. Accordingly, images from the projector can be maintained in a preferable condition without inclination of the screen members.

At the time of storage of the screen 10, the screen 10 and the wires 80 are wound around the winding shaft 41 and the drums 91, respectively, to be stored by the urging forces of the tensioning mechanisms (see FIGS. 5A and 5B and FIG. 6).

According to the screen unit 2 in the second embodiment, the following advantages can be offered.

(1) The winding mechanism 40 and the winding mechanisms 90 apply approximately the same tension to the screen 10 and the wires 80 in the up-down direction (Z direction). In this case, the force on the front surface of the pantograph mechanism 60 is balanced against the force on the rear surface of the pantograph mechanism 60, allowing the pantograph mechanism 60 to be maintained in a vertical posture. Accordingly, images from the projector can be maintained in a preferable condition without inclination of the screen members.

(2) The posture of the pantograph mechanism 60 can be controlled by rotating the projections 931 of the control shafts 93 provided on the winding mechanisms 90 for control of the urging conditions of the flat spiral springs 92.

(3) At the time of storage of the screen unit 2, the screen 10 and the wires 80 are wound around the winding shaft 41 and the drums 91 by the urging forces of the winding mechanism and the winding mechanisms 90, respectively. Thus, compactness and portability of the screen unit 2 increase.

Third Embodiment

Figure 7B:
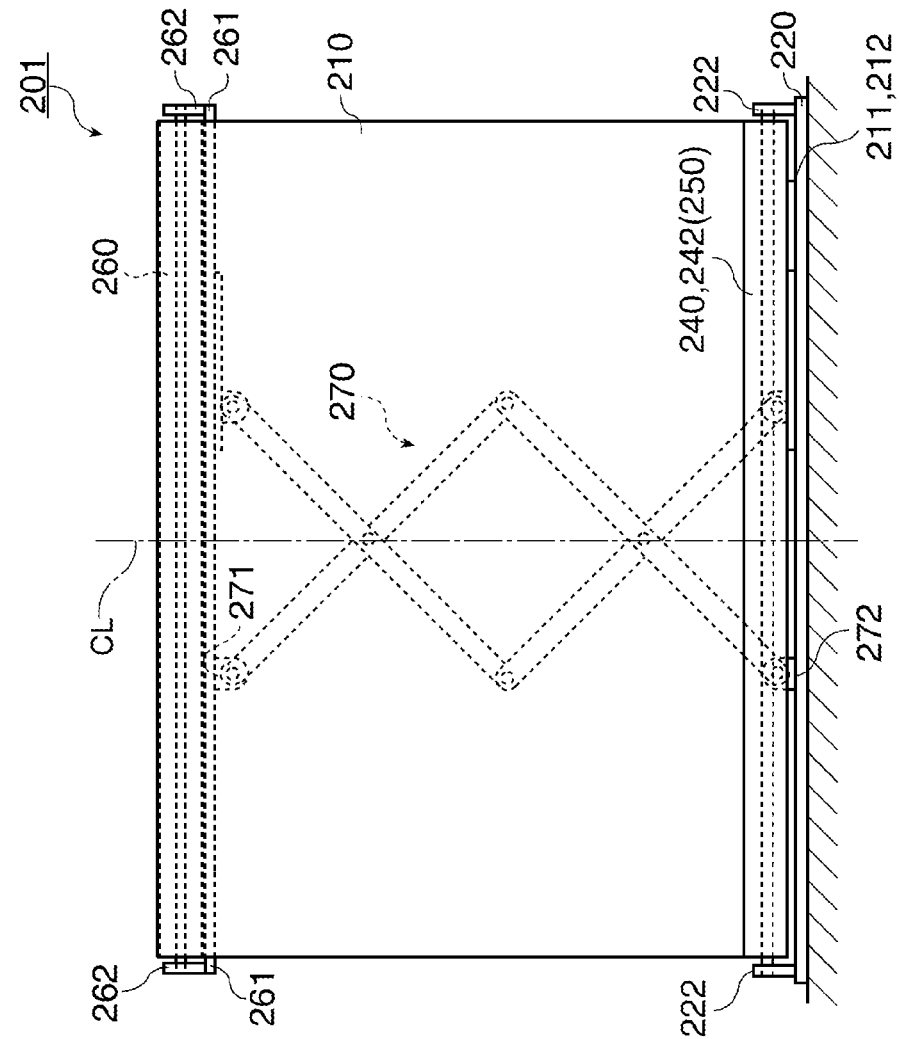
FIGS. 7A and 7B illustrate the general structure of a screen unit according to a third embodiment.
Figure 7A:
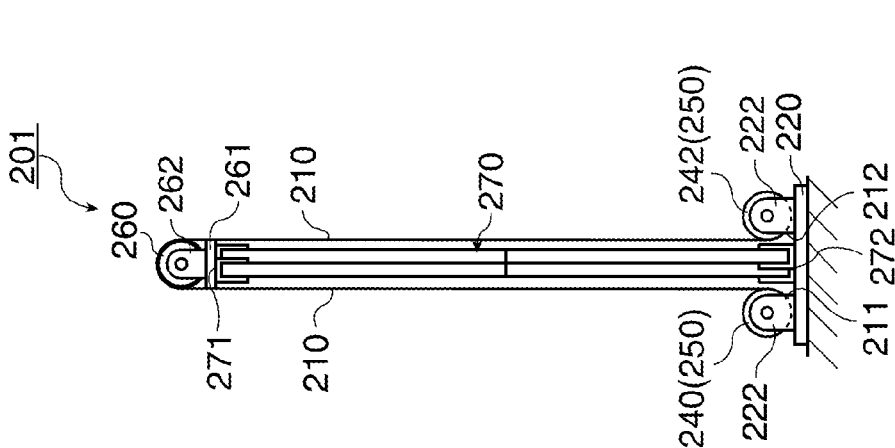
Figure 8A:
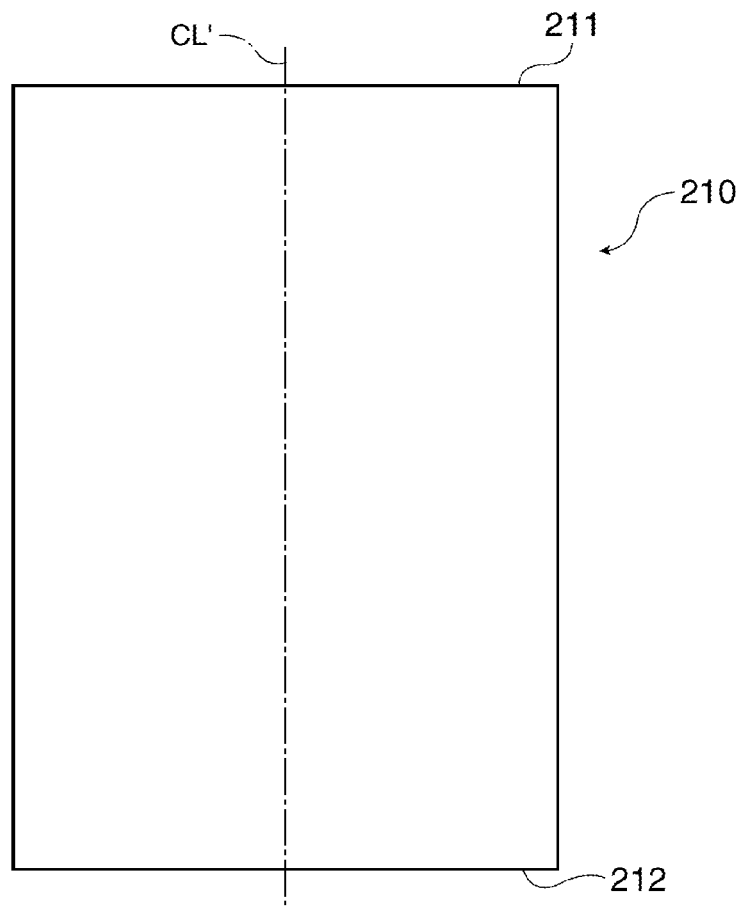
FIGS. 8A and 8B illustrate the general structure of the screen unit according to the third embodiment.
Figure 8B:
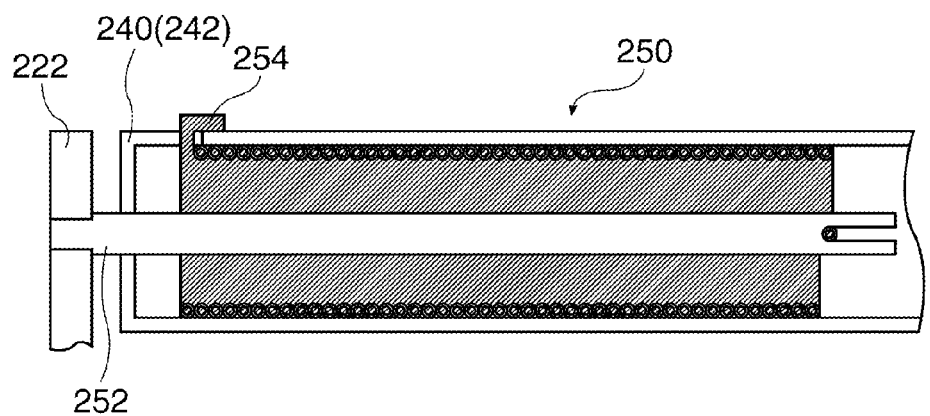

A screen unit according to a third embodiment is now described with reference to FIGS. 7A and 7B, 8A and 8B, and 9A and 9B. FIGS. 7A and 7B, 8A and 8B, and 9A and 9B illustrate the general structure of the screen unit in the third embodiment. More specifically, FIG. 7A is a side view of the screen unit in the expanded condition, and FIG. 7B is a rear view of the screen unit in the expanded condition. FIG. 8A is a plan view of a screen section, and FIG. 8B is a cross-sectional view of a winding mechanism. FIG. 8A shows a condition of the screen section removed from the screen unit and expanded. FIG. 9A is a side view of the screen unit in the stored condition, and FIG. 9B is a rearview of the screen unit in the stored condition.

As illustrated in FIGS. 7A and 7B, a screen unit 201 in the third embodiment includes a screen section 210, a base member 220, a winding shaft 240 as a second support member (support body), a winding shaft 242 as a third support member (support body), a rotation shaft 260 as a first support member (support body), winding mechanisms 250 provided on the winding shafts 240 and 242, and a connecting mechanism (elevating device) 270. The screen unit 201 is a screen unit which has the screen section 210 drawn from the screen unit 201 and expanded when the screen unit 201 is used, and wound around the winding shaft 240 and the winding shaft 242 and stored when the screen unit 201 is not used. In this embodiment, a case in which the screen unit 201 is placed on a floor surface indicated by a crosshatched area in the figures will be discussed as an application example.

The base member 220 is disposed on the floor surface side on which the screen unit 201 is placed, and extends along the floor surface. The base member 220 is a component to which the winding shafts 240 and 242 and the connecting mechanism 270 are attached. The winding shafts 240 and 242 are cylindrical components extending substantially in parallel with the extension direction of the base member 220. Each of the winding shafts 240 and 242 is supported by a pair of bearings 222 fixed to the base member 220. The winding shaft 240 is disposed on the front surface side of the connecting mechanism 270, while the winding shaft 242 is disposed on the rear surface side with the connecting mechanism 270 interposed between the winding shaft 242 and the winding shaft 240. The winding shafts 240 and 242 are shafts around which the screen section 210 is wound.

The connecting mechanism 270 is extended between the base member 220 and the rotation shaft 260. The connecting mechanism 270 is a so-called pantograph mechanism which has two pairs of arms connecting with one another, for example. Ends 271 as ends of the connecting mechanism 270 on one side are positioned on the upper side (rotation shaft 260 side), while ends 272 as ends on the other side are positioned on the lower side (base member 220 side). One of the ends 271 of the pair of the arms is supported by a fixed support, and the other of the ends 271 is supported by a movable support. Similarly, one of the ends 272 of the pair of the arms is supported by a fixed support, and the other of the ends 272 is supported by a movable support. The structure of the connecting mechanism 270 is not limited to this structure but may be any of other known structures.

An upper end support member 261 is attached to the ends 271 of the connecting mechanism 270. A pair of bearings 262 are fixed to the upper end support member 261 such that the rotation shaft 260 can be supported by the pair of the bearings 262. The rotation shaft 260 is a cylindrical component extending substantially in parallel with the winding shafts 240 and 242, and can rotate around a rotation axis extending in the extension direction of the rotation shaft 260. The ends 272 of the connecting mechanism 270 are sandwiched between the winding shafts 240 and 242.

A center line CL indicated by an alternate long and short dash line in FIG. 7B is a line which connects the center of the rotation shaft 260 in the extension direction and the centers of the winding shafts 240 and 242 in the extension directions, and crosses the extension direction of the base member 220 substantially at right angles. The connecting mechanism 270 stretches and contracts in the direction along the center line CL, that is, the direction crossing the winding shafts 240 and 242 and the rotation shaft 260 substantially at right angles to move the ends 271 and the ends 272 close to and away from each other.

At the time of expansion of the screen section 210, the connecting mechanism 270 stretches upward to separate the ends 271 and the ends 272 away from each other. As a result, the rotation shaft 260 shifts upward from the winding shafts 240 and 242. At the time of storage of the screen section 210, the connecting mechanism 270 contracts downward to move the ends 271 and the ends 272 close to each other. As a result, the rotation shaft 260 shifts downward (toward the side on which the winding shafts 240 and 242 are provided) (see FIGS. 9A and 9B).

As illustrated in FIG. 8A, the screen section 210 is constituted by one component made of reflection type screen material having flexibility. The screen section 210 has a substantially rectangular shape, and includes a side 211 as one end of the screen section 210 and a side 212 as the other end extending substantially in parallel with the side 211. The screen section 210 reflects image light projected from a projector or the like by a projection surface for display of an image. A center line CL' indicated by an alternate long and short dash line in FIG. 8A is a line connecting the center of the side 211 of the screen section 210 and the center of the side 212 of the screen section 210. The screen section 210 is attached to the screen unit 201 in such a position that the center line CL' is almost aligned with the center line CL.

As illustrated in FIG. 7A, the side 211 of the screen section 210 is supported by the winding shaft 240, and the side 212 is supported by the winding shaft 242. The screen section 210 is disposed on the front surface side of the screen unit 201 and folded toward the rear surface side along the side of the screen unit 201 where the ends 271 are provided in such a condition that approximately the central area of the screen section 210 between the side 211 and the side 212 rides on the rotation shaft 260. That is, the screen section 210 covers approximately the entire areas of the rotation shaft 260 and the connecting mechanism 270.

Since the screen section 210 of the screen unit 201 extends through both the front surface and the rear surface, the rear surface can be used as the projection surface as well on which image light is projected. The projection surfaces formed on the front surface side and the rear surface side become surfaces substantially parallel with the plane defined by the extension directions of the winding shafts 240 and 242 and the rotation shaft 260 and the direction along the center line CL. Thus, according to the screen unit 201, the side where the winding shaft 242 is disposed may be referred to as the front surface side, and the side where the winding shaft 240 is disposed may be referred to as the rear side.

Moreover, according to the screen unit 201, approximately the entire area of the connecting mechanism 270 is covered by the screen section 210 without exposure. Thus, the possibility that a finger of a user carelessly touching the connecting mechanism 270 is pinched between the arms can be reduced, for example.

As illustrated in FIG. 8B, the winding mechanism 250 is provided on each of the winding shafts 240 and 242. Each of the winding mechanisms 250 has a shaft 252 and a coil spring 254. The shaft 252 and the coil spring 254 are inserted into the end of each of the winding shafts 240 and 242 in the vicinity of the bearings 222, and extend along the winding shafts 240 and 242. The shaft 252 is supported by the corresponding bearing 222 with the rotation of the shaft 252 regulated by the bearing 222. Each of the winding shafts 240 and 242 is freely rotatable with respect to the corresponding shaft 252.

One end of the coil spring 254 is fixed to the shaft 252, and the other end of the coil spring 254 is fixed to the winding shaft 240 or 242. The coil spring 254 has a function of producing an urging force in the direction for winding the screen section 210 around the winding shafts 240 and 242. Thus, at the time of storage of the screen section 210 from the expanded condition, the side 211 of the screen section 210 is wound around the winding shaft 240, and the side 212 of the screen section 210 is wound around the winding shaft 242 by the urging forces of the coil springs 254 for storage (see FIGS. 9A and 9B). At the time of expansion of the screen section 210, the side 211 of the screen section 210 is drawn from the winding shaft 240, and the side 212 is drawn from the winding shaft 242.

With rotations of the winding shafts 240 and 242 in the direction of drawing the screen section 210, the urging forces for rotating the screen section 210 in the winding direction are applied to the winding shafts 240 and 242 by the coil springs 254. When the screen section 210 is expanded as shown in FIGS. 7A and 7B, the rotation shaft 260 is supported by the connecting mechanism 270 in the upper position with respect to the winding shafts 240 and 242. In this case, tension is applied to approximately the central portion between the side 211 and the side 212 of the screen section 210 as the portion located on the rotation shaft 260 in the direction along the center line CL toward the side 211, and also is applied to the corresponding portion toward the side 212. In this structure, warps on both the front surface side and the rear surface side of the screen section 210 can be reduced, which increases the flatness of the screen section 210.

Moreover, both the front surface side and the rear surface side of the connecting mechanism 270 are tensioned via the screen section 210 in the direction along the center line CL. In this case, the rotatable rotation shaft 260 easily shifts the screen section 210 between the front surface side and the rear surface side. Thus, even when the tension on the front surface side is different from the tension on the rear surface side, the tension applied to the front surface side of the connecting mechanism 270 can be balanced against the tension applied to the rear surface side of the connecting mechanism 270.

In case of a structure in which a screen is only attached to the front surface side of a connecting mechanism (link mechanism) as the screen unit disclosed in JP-A-2004-46078, by the winding force to the screen tension is applied to the front surface side of the connecting mechanism but not applied to the rear surface side of the connection mechanism. In this case, the force on the front surface side of the connecting mechanism is not balanced against the force on the rear surface side of the connecting mechanism under the expanded condition, which produces the possibility that the connecting mechanism is inclined toward the front surface side to which the screen is attached. When the connecting mechanism is inclined, the screen is inclined accordingly. As a result, images displayed on the projection surface of the screen projected from a projector or the like are deformed.

According to the screen unit 201, however, tension is applied to both the front surface side and the rear surface side with respect to the connecting mechanism 270 under the expanded condition of the screen section 210. In this case, the tension applied to the front surface side of the connecting mechanism 270 is cancelled by the tension applied to the rear surface side of the connecting mechanism 270, which prevents inclination of the connecting mechanism 270 and maintains a stable posture of the connecting mechanism 270. Accordingly, deformation of images displayed on the projection surface of the screen section 210 can be avoided.

Since the tension on the front surface side of the connecting mechanism 270 is almost balanced against the tension on the rear surface side of the connecting mechanism 270 regardless of whether the connecting mechanism 270 is stretched or contracted, the upper ends 271 of the connecting mechanism 270 can be kept at arbitrary heights in a stable condition. Furthermore, the expansion and storage of the screen section 210 can be executed in a stable manner.

According to the screen unit 201 in the third embodiment, the following advantages can be offered.

(1) The front surface side and the rear surface side of the screen section 210 so disposed as to cover the connecting mechanism 270 are both tensioned by the winding shafts 240 and 242. In this case, the tension applied to the front surface side of the connecting mechanism 270 is cancelled by the tension applied to the rear surface side of the connecting mechanism 270, allowing the posture of the connecting mechanism 270 to be stabilized without inclination. Thus, deformation of images displayed on the projection surface of the screen section 210 can be prevented.

(2) The tension on the front surface side of the connecting mechanism 270 is almost balanced against the tension on the rear surface side of the connecting mechanism 270 regardless of whether the connecting mechanism 270 is stretched or contracted. Thus, expansion and storage of the screen section 210 can be executed in a stable manner.

(3) Since the screen section 210 is disposed on the rear surface side, the rear surface side can be used as a projection surface as well. Accordingly, images can be simultaneously projected on the front surface side and the rear surface side.

(4) Approximately the entire area of the connecting mechanism 270 is covered by the screen section 210. Thus, the possibility that a finger of a user carelessly touching the connecting mechanism 270 is pinched by the connecting mechanism 270 or other dangers can be reduced.

Fourth Embodiment

A screen unit according to a fourth embodiment is now described with reference to the drawings. FIGS. 10A and 10B illustrate the general structure of the screen unit in the fourth embodiment. More specifically, FIG. 10A is a side view of the screen unit in the expanded condition, and FIG. 10B is a rear view of the screen unit in the expanded condition.

The screen unit in the fourth embodiment has a structure same as that of the screen unit in the third embodiment except that one end of the screen is fixed to a third support member. The same reference numbers are given to parts and components common to the corresponding parts and components in the third embodiment, and the same explanation is not repeated.

As illustrated in FIGS. 10A and 10B, a screen unit 202 in the fourth embodiment includes the screen section 210, the base member 220, the winding shaft 240, a fixed support member 244 as the third support member, the rotation shaft 260, the winding mechanism 250 provided on the winding shaft 240, and the connecting mechanism 270.

The fixed support member 244 is a component extending substantially in parallel with the extension direction of the base member 220, and is attached to the base member 220. The fixed support member 244 is disposed substantially in parallel with the winding shaft 240 and the rotation shaft 260, and is positioned on the rear surface side with the connecting mechanism 270 interposed between the winding shaft 240 and the fixed support member 244. The side 212 of the screen section 210 is fixed to the fixed support member 244.

According to the screen unit 202, the side 212 of the screen section 210 is fixed to the fixed support member 244. Thus, the side 211 of the screen section 210 is initially wound around the winding shaft 240 at the time of storage. For expansion, the side 212 of the screen section 210 is initially drawn out. With rotation of the rotation shaft 260, the screen section 210 shifts from the rear surface side to the front surface side with respect to the connecting mechanism 270 at the time of storage, and shifts from the front surface side to the rear surface side with respect to the connecting mechanism 270 at the time of expansion.

When the screen section 210 is expanded, tension is applied toward the side 211 by the winding mechanism 250 provided on the winding shaft 240. Moreover, an almost balanced condition between the tension applied to substantially the central portion between the side 211 and the side 212 of the screen unit 210 as the portion located on the rotation shaft 260 in the direction toward the side 211 and the tension applied to the corresponding portion toward the side 212 is produced by the rotation of the rotation shaft 260. As a result, the tension applied to the front surface side of the connecting mechanism 270 is cancelled by the tension applied to the rear surface side of the connecting mechanism 270 in the structure of the screen unit 202 similarly to the screen unit 201 in the third embodiment, which prevents inclination of the connecting mechanism 270.

According to the screen unit 202 in the fourth embodiment, advantages similar to those of the screen unit 201 in the third embodiment can be offered. Moreover, in case of the structure of the screen unit 202 which has the fixed support member 244 in place of the winding shaft 242 including the winding mechanism 250, the structure of the screen unit 202 can be more simplified. Thus, the material cost and manufacturing cost can be reduced to be lower than the corresponding costs of the screen unit 201 in the third embodiment.

Fifth Embodiment

Figure 11A:
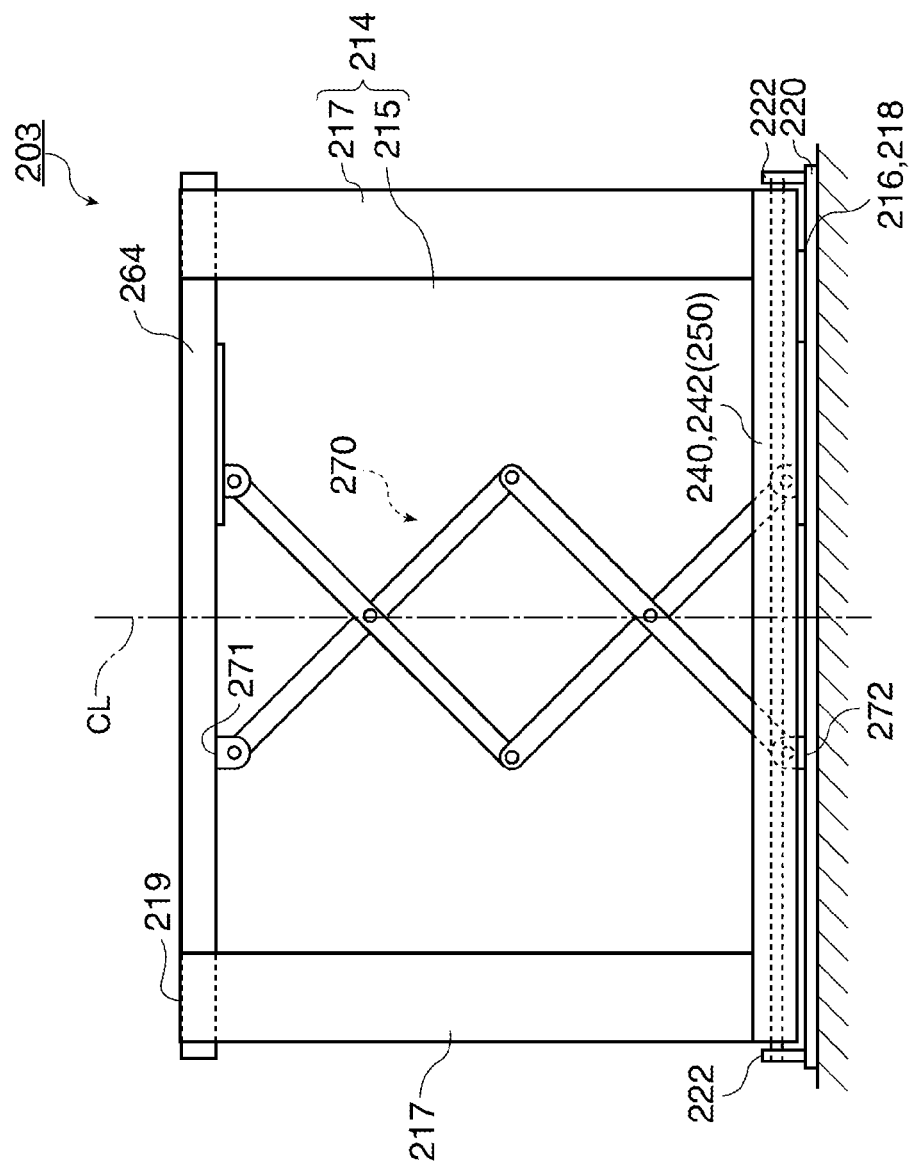
FIGS. 11A and 11B illustrate the general structure of a screen unit according to a fifth embodiment.
Figure 11B:
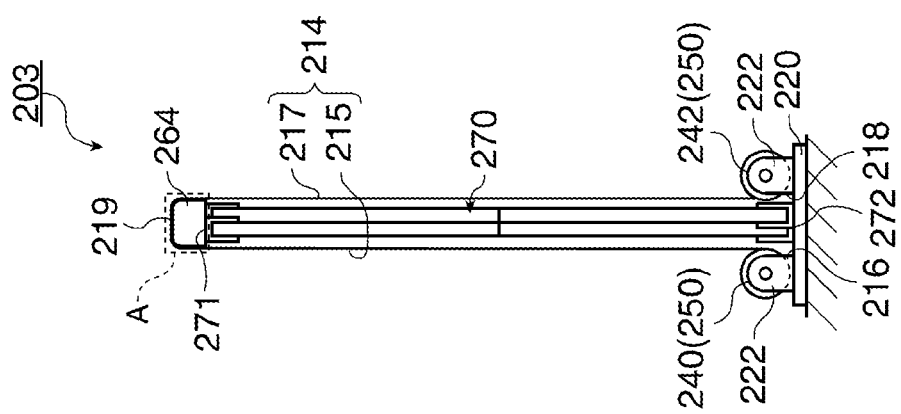

A screen unit according to a fifth embodiment is now described with reference to the drawings. FIGS. 11A and 11B and FIGS. 12A and 12B illustrate the general structure of the screen unit in the fifth embodiment. More specifically, FIG. 11A is a side view of the screen unit in the expanded condition, and FIG. 11B is a rear view of the screen unit in the expanded condition. FIG. 12A is a plan view of a screen section, and FIG. 12B illustrates an enlarged A area shown in FIG. 11A. FIG. 12A shows a condition of the screen section removed from the screen unit and expanded.

The screen unit in the fifth embodiment has a structure same as that of the screen unit in the third embodiment except that the screen section has a screen member and sheet-shaped members joined into one body by sewing, bonding, depositing or other methods, and that the first support member does not rotate. The same reference numbers are given to parts and components common to the corresponding parts and components in the third embodiment, and the same explanation is not repeated.

As illustrated in FIGS. 11A and 11B, a screen unit 203 in the fifth embodiment includes a screen section 214, the base member 220, the winding shaft 240, the winding shaft 242, a support member 264 as a first support member, the winding mechanisms 250 provided on the winding shafts 240 and 242, and the connecting mechanism 270. The support member 264 extends substantially in parallel with the winding shafts 240 and 242, and is attached to the ends 271 of the connecting mechanism 270.

As illustrated in FIG. 12A, the screen section 214 is constituted by a screen member 215 and sheet-shaped members 217 combined into one body. The screen member 215 is a substantially rectangular reflection type screen member having flexibility. The screen member 215 has a side 216 and a side 219 substantially parallel with each other. A center line CL' indicated by an alternate long and short dash line in FIG. 12A is a line connecting the center of the side 216 and the center of the side 219.

Each of the sheet-shaped members 217 has a band shape having a smaller width than that of the screen member 215, and is made of a sheet-shaped material less expensive than that of the screen member 215. The extension direction of the sheet-shaped member 217 extends substantially in parallel with the center line CL'. A pair of (two) the sheet-shaped members 217 are disposed at one end (side 219) of the screen member 215 on both sides with respect to the center line CL'. Sides 218 of the sheet-shaped members 217 as the ends opposite to the side 219 extend substantially in parallel with the side 216. The screen member 215 and the pair of the sheet-shaped members 217 are joined into one body by sewing, bonding, depositing or other methods.

As illustrated in FIGS. 11A and 11B, the side 216 of the screen section 214 (screen member 215) is supported by the winding shaft 240. The sides 218 of the screen section 214 (sheet-shaped members 217) are supported by the winding shaft 242. The screen section 214 is disposed on the front surface side of the screen unit 203 and folded toward the rear surface side along the side where the ends 271 of the connecting mechanism 270 are disposed in such a condition that the side 219 of the screen section 214 rides on the support member 264. Thus, the screen member 215 of the screen section 214 is disposed on the front surface side, and the sheet-shaped members 217 are disposed on the rear surface side.

An area of the screen section 214 around the side 219 riding on the support member 264, that is, the boundary between the screen member 215 and the sheet-shaped members 217 having band shapes is fixed to the support member 264 by an adhesive 265, for example (see FIG. 12B). Thus, according to the screen unit 203, the screen member 215 and the sheet-shaped members 217 do not shift between the front surface side and the rear surface side regardless of whether the connecting mechanism 270 is stretched or contracted at the time of expansion or storage of the screen section 214. Accordingly, the screen member 215 is kept disposed on the front surface side, and the sheet-shaped members 217 are kept disposed on the rear surface side.

Under the condition in which the screen section 214 is expanded, tension is applied to the boundary between the screen member 215 and the sheet-shaped members 217 having band shapes in the direction along the center line CL toward the side 216 (toward the screen member 215), and is also applied to the corresponding portion in the direction toward the side 218 (toward sheet-shaped members 217) by the urging forces of the winding mechanisms 250 (coil springs 254). Thus, the tension applied to the front surface side of the connecting mechanism 270 can be cancelled by the tension applied to the rear surface side of the connecting mechanism 270, which prevents inclination of the connecting mechanism 270 in the screen unit 203 similarly to the screen unit 201 in the third embodiment.

According to the screen unit 203, the projection surface is formed on the front surface side where the screen member 215 is disposed, but is not formed on the rear surface side where the sheet-shaped members 217 having band shapes are disposed. Since the sheet-shaped members 217 are disposed at both ends of the support member 264 and the winding shaft 242, the connecting mechanism 270 is exposed on the rear surface side. Thus, control, repair and the like required for the connecting mechanism 270 can be carried out in the expanded condition of the screen section 214.

For storing the screen section 214 under the expanded condition, the side 216 (screen member 215 side) is wound around the winding shaft 240, and the sides 218 (sheet-shaped members 217 side) are wound around the winding shaft 242. At the time of expansion of the screen section 214, the side 216 (screen member 215 side) is drawn from the winding shaft 240, and the sides 218 (sheet-shaped members 217 side) are drawn from the winding shaft 242.

The boundary between the screen member 215 and the band-shaped sheet-shaped members 217 of the screen section 214 is fixed to the support member 264. In this case, the screen member 215 and the sheet-shaped members 217 do not overlap with each other under the condition in which the screen section 214 is wound around the wounding shafts 240 and 242 and stored. This arrangement prevents deformation or the like which may be given to the screen member 215 by a step produced between the area where the sheet-shaped members 217 are provided and the area where the sheet-shaped members 217 are not provided, or a step produced by sewing, bonding, depositing or the like on the boundary when the screen member 215 is overlapped with the sheet-shaped members 217 having band shapes.

According to the screen unit 203 in the fifth embodiment, advantages substantially similar to those of the screen unit 201 in the third embodiment can be offered. Moreover, in case of the structure of the screen unit 203 which has the area on the rear surface side of the screen section 214 constituted by the sheet-shaped members 217 having band shapes, the weight and the material cost of the screen unit 203 can be reduced to be smaller and lower than those of the screen unit 201 in the third embodiment.

According to the fifth embodiment, the screen section 214 has the two sheet-shaped members 217 disposed at both ends of the support member 264 and the winding shaft 242. However, the screen section 214 may have only the one sheet-shaped member 217 disposed substantially at the center (on the center line CL) of the support member 264 and the winding shaft 242, or three or a larger number of the sheet-shaped members 217.

While the respective embodiments of the invention have been described herein, various modifications and changes including the modified examples listed below may be made without departing from the scope of the invention.

MODIFIED EXAMPLE 1

According to the screen units 201 and 202 in the third embodiment and the fourth embodiment, the rotation shaft 260 is provided on the upper ends 271 of the connecting mechanism 270. However, the screen unit may have a support member as the first support member which has a surface having a small friction coefficient and does not rotate in an area contacting the screen section in place of the rotation shaft 260.

In this case, the friction coefficient of the surface is reduced by forming a smooth curved surface on the area of the first support member contacting the screen section and coating the surface with fluororesin or the like or by other methods. When the support member is provided as the component which includes the surface having a small friction coefficient, the screen section 210 can easily shift between the front surface side and the rear surface side by sliding on the surface of the support member. Accordingly, the tension applied to the front surface side of the connecting mechanism 270 can be balanced against the tension applied to the rear surface side of the connecting mechanism 270 similarly to the screen units 201 and 202 in the third embodiment and the fourth embodiment.

Furthermore, even in the structure which has the winding shaft at one end of the screen section 210 and the fixed support member at the other end as in the fourth embodiment, the screen section 210 can shift from the rear surface side to the front surface side by sliding on the surface of the support member, allowing the side 211 to be initially wound for storage of the screen section 210. The support member may be made of material having a small friction coefficient.

MODIFIED EXAMPLE 2

According to the screen units 201 and 202 in the third embodiment and the fourth embodiment, the screen section 210 is constituted by one screen member made of single material. However, the screen section may be formed by a screen member and a different sheet component combined into one body by sewing, bonding, depositing or other methods.

When the screen section has a screen member on the front surface side and a sheet component less expensive than the screen member or a sheet component more lightweight than the screen member on the rear surface side, the material cost and weight of the screen unit can be reduced. When the screen section has two screen members having different characteristics on the front surface side and the rear surface side, respectively, the projection surface on the front surface side and the projection surface on the rear surface side can be used for different purposes in accordance with conditions such as the use environments and the types of devices for projecting image light.

MODIFIED EXAMPLE 3

According to the screen unit 203 in the fifth embodiment, the screen member 215 and the band-shaped sheet-shaped members 217 of the screen section 214 are joined into one body by sewing, bonding, depositing or other methods. However, the screen section may be constituted by one screen member made of single material from which the portion other than the areas of the screen member 215 and the sheet-shaped members 217 is cut or removed, for example, for producing the one body screen section. According to this structure, a step produced by sewing, bonding, depositing or the like on the boundary between the front surface side and the rear surface side of the screen section can be eliminated.

MODIFIED EXAMPLE 4

While the cases in which the screen units 1, 2, 201, 202, and 203 in the first through fifth embodiments are placed on the floor surface have been discussed as examples, the screen units 1, 2, 201, 202, and 203 may be installed on a ceiling surface and used thereon.

What is claimed is:
1. A screen unit comprising:
a screen member on which an image is projected;
a first support member which supports one end of the screen member;
a second support member which supports the other end of the screen member;
a stretching and contracting device which stretches in a predetermined direction to expand the screen member and supports the first support member; and
a tensioning member disposed on the side opposite to the side where the screen member is provided with respect to the stretching and contracting device to apply tension in a direction substantially parallel with the direction from the first support member to the second support member, wherein the first support member is attached to the one end of the screen member; one end of the stretching and contracting device is attached to the first support member; and one end of the tensioning member is attached to the first support member.
2. The screen unit according to claim 1, wherein the screen member has flexibility.
3. The screen unit according to claim 2, further comprising:
a base member attached to the other end of the stretching and contracting device; and
a third support member attached to the other end of the tensioning member,
wherein the second support member or the third support member is attached to the base member.
4. The screen unit according to claim 2, wherein the tensioning member is made of flexible material.
5. The screen unit according to claim 4, wherein the second support member or the third support member has a winding structure.
6. The screen unit according to claim 1, wherein:
the tensioning member is a string-shaped member; and
the second support member or the third support member has a winding structure.

7. The screen unit according to claim 1, further comprising:
a screen section which includes the screen member and a sheet-shaped member disposed at one end of the screen member and combined with the screen member into one body;
a third support member which supports the end of the sheet-shaped member opposite to the end where the screen member is disposed; and
a winding mechanism provided on at least either the second support member or the third support member,
wherein
the stretching and contracting device stretches and contracts in directions toward one end and the other end of the stretching and contracting device,
the first support member is supported by one end of the stretching and contracting device,
the second support member and the third support member are disposed on the side where the other end of the stretching and contracting device is disposed with the stretching and contracting device interposed between the second support member and the third support member, and
the screen section is folded on the side where the one end of the stretching and contracting device is disposed in such a condition as to ride on the first support member.

8. The screen unit according to claim 7, wherein:
the second support member extends along the other end of the screen member;
the third support member extends substantially in parallel with the second support member;
the first support member extends substantially in parallel with the second support member and the third support member; and
the stretching and contracting device stretches and contracts in a direction substantially perpendicular to the extension directions of the second support member and the third support member.

9. The screen unit according to claim 7, wherein the winding mechanism is provided on each of the second support member and the third support member.

10. The screen unit according to claim 9, wherein a boundary area of the screen section between the screen member and the sheet-shaped member is fixed to the first support member.

11. The screen unit according to claim 10, wherein the sheet-shaped member includes a band-shaped portion having a width smaller than that of the screen member.

12. The screen unit according to claim 7, wherein:
the winding mechanism is provided on either the second support member or the third support member; and
the other of the second support member and the third support member is a fixed support member.

13. The screen unit according to claim 7, wherein the first support member is rotatable around a rotation axis extending along the extension direction of the first support member.

14. The screen unit according to claim 7, wherein an area of the first support member contacting the screen section has a surface having a small friction coefficient.

15. The screen unit according to claim 7, wherein the screen section is one component formed by single material.

16. A screen unit comprising:
a substantially rectangular screen member having flexibility;
a first support body attached to one end of the screen member;
a second support body attached to the other end of the screen member and disposed so as to be opposed to the first support body;
an elevating mechanism one end of which is attached to the first support body; and
a tensioning member disposed on the side opposite to the side where the screen member is disposed with respect to the elevating mechanism, one end of the tensioning member attached to the first support body, and the tensioning member applying tension in a direction substantially parallel with the direction from the first support body to the second support body, wherein the first support body is attached to the one end of the screen member.

17. A screen unit comprising:
a screen section including a screen member on which image light is projected, and a sheet-shaped member disposed at one end of the screen member and combined with the screen member into one body;
a second support member extending along the other end of the screen member of the screen section to support the other end of the screen member;
a third support member which supports the end of the sheet-shaped member of the screen section opposite to the end where the screen member is disposed, and extends substantially in parallel with the second support member;
a winding mechanism provided on at least either the second support member or the third support member;
a connecting mechanism which stretches and contracts in a direction substantially perpendicular to the extension directions of the second support member and the third support member to shift one end and the other end of the connecting mechanism close to and away from each other; and
a first support member supported by the one end of the connecting mechanism and extending substantially in parallel with the second support member and the third support member,
wherein the second support member and the third support member are disposed on the side where the other end of the connecting mechanism is disposed with the connecting mechanism interposed between the second support member and the third support member, the screen section is folded on the side where the one end of the connecting mechanism is disposed in such a condition that the screen section rides on the first support member; the first support member is attached to the one end of the screen member; one end of the connecting mechanism is attached to the first support member; and one end of a tensioning member is attached to the first support member.

18. A screen unit comprising:
a screen section including a screen member on which image light is projected;
a second support member extending along one end of the screen section to support the one end of the screen section;
a third support member which supports the other end of the screen section opposite to the one end of the screen section, and extends substantially in parallel with the second support member;
a winding mechanism provided on at least one of the second support member and the third support member;
a connecting mechanism which stretches and contracts in a direction substantially perpendicular to the extension directions of the second support member and the third support member to shift one end and the other end of the connecting mechanism close to and away from each other; and a first support member supported by the one end of the connecting mechanism and extending substantially in parallel with the second support member and the third support member, wherein the screen section rides on the first support member such that the screen section is folded from a front surface side of the connecting mechanism to a rear surface side of the connecting mechanism; and the second support member and the third support member are disposed such that a tension applied to the front surface side of the connecting mechanism is substantially balanced against a tension applied to the rear surface side of the connecting mechanism.

\* \* \* \* \*